United States Patent [19]
Kowatari et al.

[11] Patent Number: 5,750,889
[45] Date of Patent: May 12, 1998

[54] AIR FLOW RATE MEASURING APPARATUS AND AIR FLOW RATE MEASURING METHOD

[75] Inventors: Takehiko Kowatari, Ibaraki; Nobukatsu Arai, Ushiku; Chihiro Kobayashi, Hitachinaka, all of Japan

[73] Assignee: Hitachi, Ltd., Tokyo, Japan

[21] Appl. No.: 605,157

[22] PCT Filed: Jun. 13, 1995

[86] PCT No.: PCT/JP95/01178

§ 371 Date: Feb. 13, 1996

§ 102(e) Date: Feb. 13, 1996

[87] PCT Pub. No.: WO95/34753

PCT Pub. Date: Dec. 21, 1995

[30] Foreign Application Priority Data

Jun. 13, 1994 [JP] Japan ................. 6-130112

[51] Int. Cl.$^6$ .............. F02D 41/18; F02D 45/00; G01F 1/68; G01F 1/72
[52] U.S. Cl. .............. 73/118.2; 73/202.5; 73/204.11; 364/431.03; 364/431.04
[58] Field of Search .............. 73/115, 116, 117.2, 73/117.3, 118.1, 118.2, 202.5, 204.11, 204.22, 196, 198, 199, 801.06, 113, 114; 364/431.03, 431.04

[56] References Cited

U.S. PATENT DOCUMENTS

| | | |
|---|---|---|
| 4,672,566 | 6/1987 | Asano et al. ............... 73/118.2 |
| 4,719,890 | 1/1988 | Wataya et al. ............... 73/118.2 |
| 4,807,151 | 2/1989 | Citron ............... 73/118.2 |
| 5,014,550 | 5/1991 | Gee et al. ............... 73/118.2 |
| 5,092,164 | 3/1992 | Matsuoka et al. ............... 73/118.2 |
| 5,317,910 | 6/1994 | Steinbrenner et al. ............... 73/118.2 |
| 5,339,680 | 8/1994 | Bronkal et al. ............... 73/118.2 |
| 5,517,971 | 5/1996 | Nishimura et al. ............... 73/118.2 |
| 5,569,847 | 10/1996 | Hasegawa et al. ............... 73/118.2 |

FOREIGN PATENT DOCUMENTS

| | | |
|---|---|---|
| A-59-176450 | 10/1984 | Japan. |
| B-62-11175 | 3/1987 | Japan. |
| B-62-14705 | 4/1987 | Japan. |
| B-1-34288 | 7/1989 | Japan. |
| A-4-72524 | 3/1992 | Japan. |

OTHER PUBLICATIONS

W. Follmer, "Frequency Domain Characterization of Mass Air Flow Sensors", SAE Paper No. 880561, pp. 111–119.

E. Hendricks et al., "Coventional Event Based Engine Control", SAE Paper No. 940377, pp. 145–164.

*Primary Examiner*—George M. Dombroske
*Attorney, Agent, or Firm*—Antonelli, Terry, Stout, & Kraus, LLP

[57] ABSTRACT

An air flow rate measuring apparatus for measuring an intake air amount of an internal combustion engine by use of a thermal air flow meter comprises means inputted with the output of the thermal air flow meter for correcting a response delay of the output and outputting the corrected output, and means inputted with the output of the correcting means for transforming it to a value corresponding to an air flow rate on the basis of the characteristic of the thermal air flow meter stored beforehand.

15 Claims, 10 Drawing Sheets

5,750,889

AIR FLOW RATE MEASURING APPARATUS AND AIR FLOW RATE MEASURING METHOD

TECHNICAL FIELD

The present invention relates to an air flow rate measuring apparatus with a thermal air flow meter which is used in, for example, an electronic fuel injection system for a vehicle engine, and more particularly to an air flow rate measuring apparatus and measuring method to which a signal processing method for accurately measuring a pulsating flow rate is applied.

BACKGROUND ART

A thermal air flow meter is arranged, for example, on the upper stream side of the intake duct of an engine above a throttle and is used for the purpose of measuring an intake air flow rate of vehicle engine having an electronic fuel injection system. In this kind of thermal air flow meter, a situation can occur where an air flow sensor for a vehicle having a slow response exhibits an abnormally lowered value of the detected flow rate due to an influence caused by a pulsation flow which is generated in the intake duct in a state in which the throttle opening angle is large or in a state in which a load is large. This is disclosed by JP-B-59-17371. It is explained that the lowering is mainly caused from the slow response of the sensor and the non-linear output characteristic thereof it is further explained that the problem of lowering can be avoided by using a fine hot wire which has a high-speed response or a linearizer by which the output is linearized at a high speed. In the thermal air flow meter disclosed by the JP-B-59-17371, a compensation is made for the lowering of the detected flow rate by detecting the full amplitude of the pulsating sensor output, multiplying the detected amplitude value by a correction factor and adding the result of multiplication to the value of a mean output.

The compensation for a signal in the thermal air flow meter is roughly classified into two ways. An example disclosed by SAE Paper No. 880561 or SAE Paper No. 940377 uses a model of the thermal air flow meter in which a response delay is added to a variation in flow rate and a non-linear output characteristic is further added so that the value of addition is taken as the output of the thermal air flow meter. Also, an example disclosed by JP-B-6-13859 or JP-A-4-358743 uses a method in which signal processing for compensating for a response is performed for the signal of a thermal air flow meter having a slow response to determine a true flow rate. In this method, the signal is transformed to a flow rate by use of a linearizer prior to an inverse transformation for response compensation and the inverse transformation is thereafter performed to compensate for the response. In substance, both the methods disclosed by JP-B-6-13859 and JP-A-4-35873 perform the inverse transformation in a model of the thermal air flow meter. The inverse transformation is a signal processing operation for correcting the response delay of the input/output characteristic of the system. By the inverse transformation, the output is transformed so that it becomes the same in amplitude and phase as the original input signal.

The outline of the model of a thermal air flow meter shown in FIG. 1 of the SAE Paper No. 880561 is shown in FIG. 15. In this model, a pulsating flow rate is first added with a delay 501 caused by the heat capacity of a thermal element and the transfer of heat to a base material and is further added with a non-linear output characteristic 502. Also, in a mathematical model shown by equation 8 and equation 8b of the SAE Paper No. 940377 and dealing with a model similar to that in the SAE Paper No. 880561, the ultimate output signal waveform is a waveform which is smoothed by the addition of the first-order response delay to the flow rate waveform and is further added with a non-linear output characteristic.

In the models disclosed by the JP-B-6-13859 and the JP-A-4-358743, a true variation in flow rate is determined by processing the output signal in a sequence reverse order to that in the above-mentioned example. The outline of the inverse transformation signal processing is shown in FIG. 16. In this model, the output of a thermal air flow meter is linearized by a linearizer 601 and is then subjected to inverse transformation 602 for compensation of a response delay, thereby determining a true flow rate. In actual practice, however, a procedure of changing a time constant is added at the time of inverse transformation since the response delay depends upon the flow rate.

In the example disclosed by the JP-B-6-13859, a true pulsating flow rate is determined in accordance with a procedure as shown in FIG. 17. Namely, an output signal of the thermal air flow meter is first A/D converted in step 301, is then linearized by a linearizer in step 302 and is thereafter subjected to inverse transformation in step 304. Here, the modeling is made by separating the signal into two portions inclusive of one portion directly responding to the input and the other portion responding to the input with the first-order delay so that two factors of the weighting and the time constant for each portion used in the inverse transformation are determined through the feed-back of the result of the preceding inverse transformation (step 305). Further, since the intermediate result of the preceding inverse transformation is also used as a factor, this intermediate result is also fed back. With the use of these three kinds of factors, the signal passed through the linearizer in step 302 is inversely transformed in step 304, thereby making it possible to accurately reproduce a true flow rate even in a thermal flow meter which has a response delay. In FIG. 17, [0] means that the value is determined from the result of a present A/D conversion and [−1] mean that the value is determined from the result of a preceding A/D conversion.

Also, the outline of the example disclosed by the JP-A-4-35873 is shown in FIG. 18. As shown, a signal subjected to A/D conversion (step 401) is separated into two systems so that an error from a true flow rate is determined in one of the two systems and the determined error is added to the other system in final step 406 to determine the true flow rate. Explaining the outline of the system for determining the error, a time constant represented by the function of an air flow rate is determined in step 402 on the basis of the A/D converted signal and two factors related to this time constant and the period of A/D conversion are thereafter determined in step 403. The value of A/D conversion is stored into a memory 404. The error from the true flow rate is determined through an inverse transformation in step 405. The two factors, the preceding value of A/D conversion stored in the memory, the present value of A/D conversion and the preceding determined error are used in performing the operation of inverse transformation. The error determined through the inverse transformation is multiplied by a gain and is then added to the original value of A/D conversion, thereby determining the true flow rate (see FIG. 15). In this example, the true air flow rate is determined without taking the non-linearity of the thermal flow meter into consideration and the time constant depending upon the flow rate is determined directly from the A/D value. Therefore, this example is a system in which an inverse transformation for response compensation is performed in regard to a signal after having been passed through the linearizer.

However, even if the inverse transformation for response compensation is performed after the linearization of the output of the thermal flow meter, as disclosed by the JP-B-6-13859 and the JP-A-4-358743, the amplitude is approximated to a certain extent but a true mean intake air flow rate important for the determination of an engine air/fuel ratio cannot be obtained, as explained in the following.

FIG. 6 shows a relationship between the true mean air flow rate and the detected air flow rate when a load is changed with an engine rotation speed kept constant. A curve 93 is obtained by averaging the output of a thermal air flow meter with a response delay through the linearization thereof. In a high load region having a large flow rate, the detected flow rate is first lowered and thereafter increased. The lowering of the detected flow rate is caused by the presence of a response delay and the non-linearity of an output characteristic, as is also explained by the JP-B-59-17371. Also, only the absolute value of a flow rate can be measured by the thermal air flow meter. This means that the flow rate of a counterflow is also detected and added. Therefore, the sudden increase of the detected flow rate is exhibited in the maximum load region having the large flow rate. In regard to this increase of the detected flow rate, no solution is obtained in principle even if the inverse transformation for response compensation is performed.

On the other hand, in regard to the phenomenon of lowering of the detected flow rate, no true mean flow rate is determined in the system disclosed by the JP-B-6-13859 and the JP-A-4-358743, that is, the system in which the inverse transformation for response compensation is performed after the linearization of the output signal of the thermal air flow meter (even if a procedure as explained by the published specification is undergone).

FIG. 19 shows an actual example in which an output having a response delay is transformed to a flow rate by a linearizer and is then subjected to inverse transformation for response compensation. In FIG. 19 are shown a true flow rate waveform 704 (in absolute value) for 900 revolutions per minute of a four-cylinder engine having the displacement of 2 liters, the mean value 701 of the waveform 704, a detected flow rate waveform 705 obtained by transforming the output of the thermal air flow meter to a flow rate by the linearizer, the mean value 702 of the waveform 705, a waveform 706 obtained by inversely transforming the waveform 705, and the mean value 703 of the waveform 706. Thus, the phase and amplitude of the inversely transformed waveform 706 are restored. Namely, it can be said that the purpose of compensation for the response delay is achieved. However, the inversely transformed waveform 706 in the vicinity of the lowest and highest flow rates exhibits values smaller than the true flow rate waveform 704 and the mean value 703 is substantially equal to the mean value 702 before the inverse transformation. Thus, in a state in which the detected flow rate is lowered, the air/fuel ratio of the engine cannot be controlled accurately, which is not preferable since it is followed by the deterioration of an engine stall or exhaust emission.

Also, in the example disclosed by the JP-A-4-358743, since the gain is given (step 407) after the determination of the error through the inverse transformation for response compensation, as shown in FIG. 18, it is possible to correct the lowering of the mean value. However, since the lowering of the mean value is caused from the non-linearity of the output and the response, as explained by the JP-B-59-17371, the gain must be made variable at any time in accordance with the frequency and amplitude of a pulsating flow rate and the mean value of the flow rate. Accordingly, there is a drawback that a complicated map similar to that in the conventional system is required.

As mentioned in the foregoing, when the mean value of a pulsating flow rate is measured by a thermal air flow meter having a response delay, there may be the case where the mean detected flow rate is lowered. In the case where the compensation for the lowering of the detected flow rate is made by the inverse transformation, there is a drawback that the determination of a true mean flow rate value is impossible in principle even if a signal after having passed through the linearizer is inversely transformed.

An object of the present invention is to provide an air flow rate measuring apparatus and an air flow rate measuring method in which a signal processing method of determining a true mean flow rate at a high speed and at a low cost is employed when the mean value of a pulsating flow rate is measured by a thermal air flow meter having a response delay.

DISCLOSURE OF INVENTION

The present invention provides an air flow rate measuring apparatus for measuring an intake air amount of an internal combustion engine by use of a thermal air flow meter, comprising means inputted with the output of the thermal air flow meter for correcting a response delay of the output and outputting the corrected output, and means inputted with the output of the correcting means for transforming it to a value corresponding to an air flow rate on the basis of the characteristic of the thermal air flow meter stored beforehand.

An air flow rate measuring apparatus according to one embodiment of the present invention comprises sampling means for periodically sampling an output signal of a thermal air flow meter, and operating means for determining a time constant from the signal sampled by the sampling means, inversely transforming the output signal to a signal corresponding to a true flow rate with the time constant being taken as a parameter and subjecting the inversely transformed signal to linearization to determine a flow rate.

An air flow rate measuring apparatus according to an embodiment of the present invention comprises sampling means for periodically sampling an output signal of a thermal air flow meter, time constant determining means for determining a time constant from the signal sampled by the sampling means, inverse transformation means for transforming the output signal to a signal corresponding to a true flow rate with the time constant being taken as a parameter, and linearizing means having a linearizing function for the inversely transformed signal, a flow rate being determined by linearizing the output signal by the linearizing means after the determination of the time constant by the time constant determining means and the inverse transformation of the output signal by the inverse transformation means.

An air flow rate measuring apparatus according to another embodiment of the present invention comprises an A/D converter for periodically sampling an output signal of a thermal air flow meter, and operating means for separating a digital signal obtained through the A/D conversion by the A/D converter into two systems so that an inverse transformation for determining an error from an output corresponding to a true flow rate is performed in a first system and the inversely transformed value is added to a second system, and subjecting a signal obtained by the addition to linearization to determine a flow rate.

According to a further embodiment of the present invention, the time constant is a time constant of a first-order delay and the time constant is determined by the time constant determining means from an output obtained by directly linearizing the output signal of the thermal air flow meter by linearizing means. Also, the inverse transformation means performs an operation of $$V_{INV} = \frac{1}{2}(V_{-1}+V_0)+\tau/T\cdot(V_0-V_{-1})$$

provided that the inversely transformed signal is $V_{INV}$, the output signal of the thermal air flow meter is V, the time constant is $\tau$, the sampling period is T, the value of the output signal at the present instant of time is added with a subscript 0, and the value of the output signal at the preceding sampling instant of time is added with a subscript −1. The linearizing means for determining the time constant and the linearizing means for linearizing the inversely transformed signal may be realized by the same means.

Also, the sampling period may be defined in accordance with the crank angle. The sampling period may be each crank angle equal to or smaller than 12°. The sampling period may be each time measured by clocks and this period can be set variably in accordance with the rotation speed. The air flow rate measuring apparatus may be provided with means for discriminating a counterflow in the engine.

In an air flow rate measuring method according to the present invention, an output signal of a thermal air flow meter is periodically sampled, a time constant is determined from the sampled signal, the output signal is inversely transformed to a signal corresponding to a true flow rate with the determined time constant being taken as a parameter, and the inversely transformed signal is subjected to linearization to determine a flow rate.

In the invention disclosed by the JP-B-59-17371, the lowering of a mean detected flow rate is not generated if the averaging is made after a pulsating flow rate is measured by a thermal air flow meter having a satisfactory response and the output of the thermal air flow meter is passed through a linearizer, as shown in FIG. 16. In other words, the reason why a detected flow rate is lowered in a thermal air flow rate having a slow response is that the output of the thermal air flow meter corresponds to an output which is passed through a non-linear output characteristic 502 and is thereafter added with a response delay 501, as shown in FIG. 13 of this application. Namely, when considered in a frequency domain, the inverse transformation for response compensation has a function of amplifying a frequency component as well known but has almost no function of amplifying a mean value. Accordingly, as shown in FIG. 6, even if the inverse transformation for response compensation is performed for the detected flow rate waveform in the case where the detected flow rate is lowered, an error of the lowering of the detected flow rate is not eliminated and hence a true air flow rate is not determined. Therefore, in the case where a true flow rate is to be determined from an output of a thermal air flow meter having a delay, the linearization by a linearizer 601 must be made after an inverse transformation 602 for compensation for the response of the thermal air flow meter, as shown in FIG. 14. The lowering of a detected flow rate can be avoided by performing the inverse transformation 602 to obtain a signal equivalent to that in a thermal air flow meter having a rapid response and making the linearization for the flow rate.

With the above construction, it becomes possible to determine a true pulsating air flow rate even if the pulsating intake air flow rate of an engine is measured by a thermal air flow meter having a slow response. Also, in a flow rate measuring method, it is possible to perform signal processing in which the time constant is a time constant of a first-order delay and the time constant is determined by time constant determining means from an output obtained by directly linearizing an output signal of the thermal air flow meter by linearizing means. As a result, it becomes possible to determine a true pulsating air flow rate even if a pulsating intake air flow rate is measured by a thermal air flow meter having a slow response.

According to a still further embodiment, the output of a thermal air flow meter is A/D converted, a flow rate is temporarily determined from the value of A/D conversion by use of a linearizer, a time constant is determined and an inverse transformation for responsibility compensation is performed using three variables which include the time constant, the preceding value of A/D conversion stored in a memory and the present value of A/D conversion. Thereby, a signal is obtained which corresponds to the output signal of a thermal flow meter having a satisfactory response. This signal is transformed by the linearizer to a flow rate signal, thereby making it possible to faithfully reproduce a true flow rate. As a result, the lowering of a mean value is not observed even if a pulsating air flow rate is measured by a thermal air flow meter having a slow response. Therefore, an accurate mean intake air flow rate important in determining the fuel injection amount of an engine can be determined at a high speed and at a low cost.

BEST MODE FOR CARRYING OUT THE INVENTION

Figure 1:
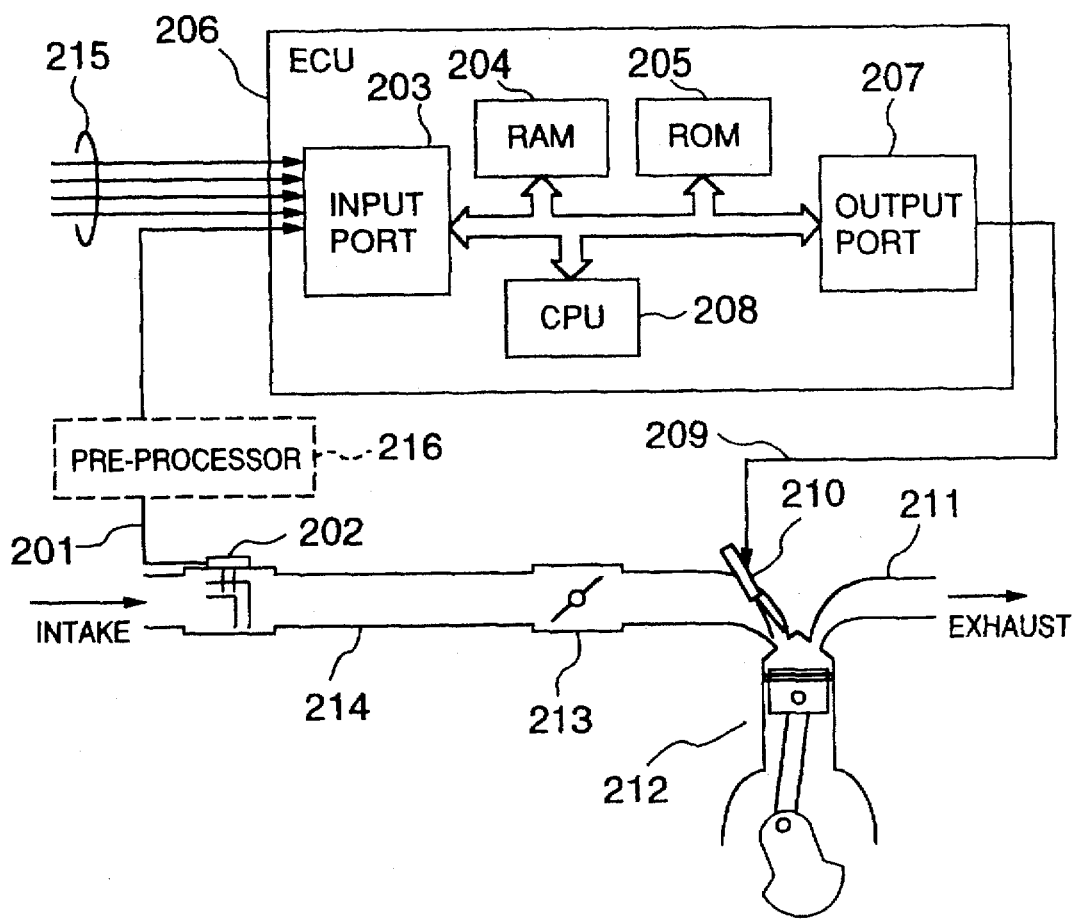
FIG. 1 is a diagram showing the construction of an air flow rate measuring apparatus according to the first embodiment of the present invention.
Figure 2:
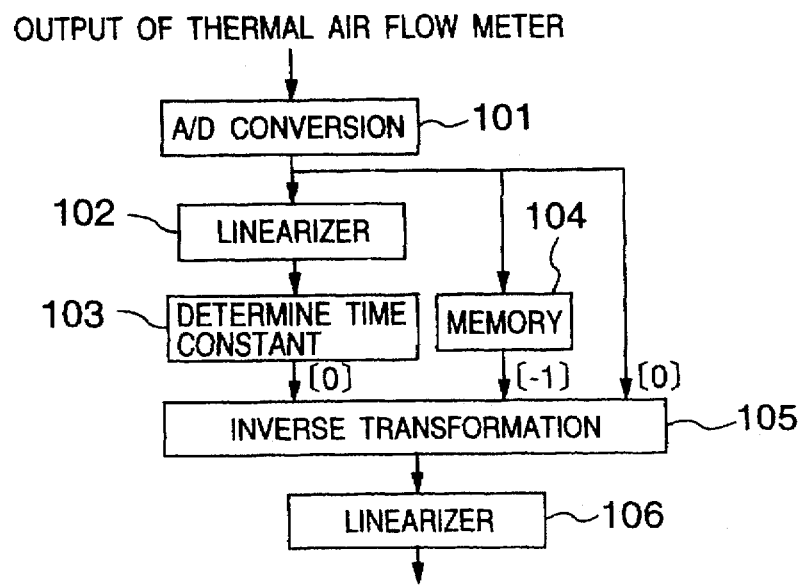
FIG. 2 is a flow chart of a signal processing method in an embodiment of an air flow rate measuring method of the present invention.
Figure 3:
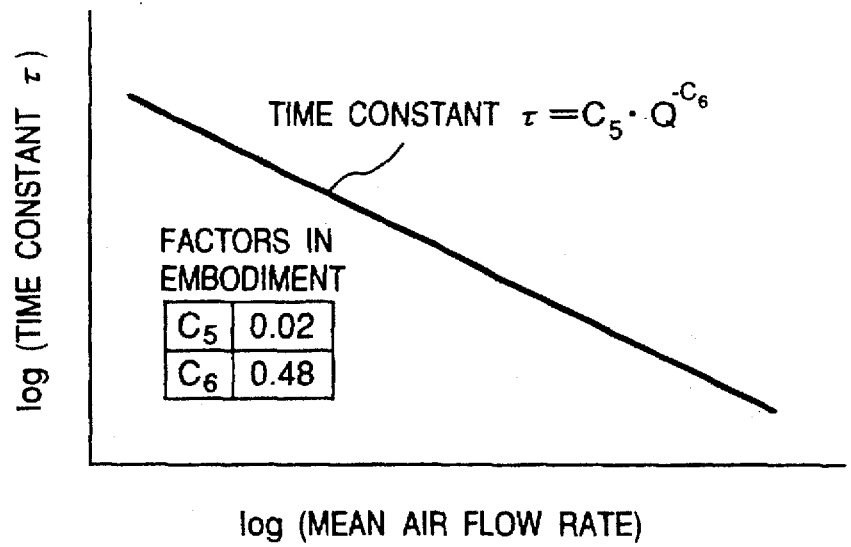
FIG. 3 is a diagram showing a relationship between an air flow rate and a time constant.
Figure 5:
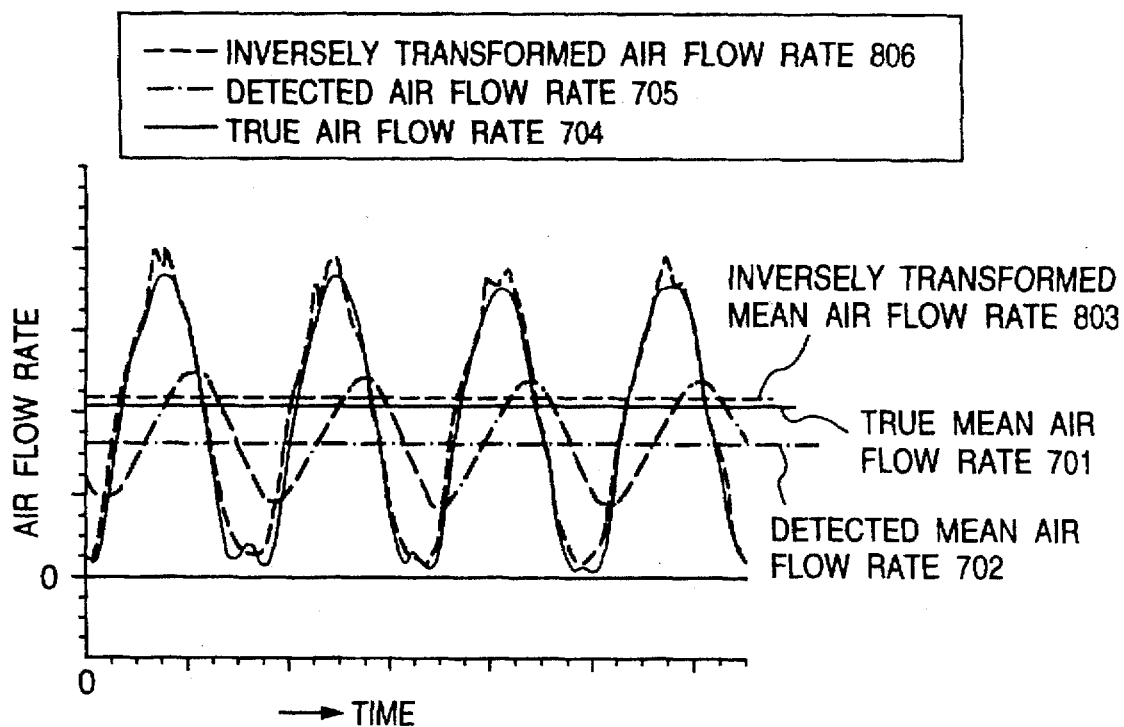
FIG. 5 is a diagram showing a processed signal waveform obtained in accordance with an inverse transformation system in the embodiment of the present invention.
Figure 4:
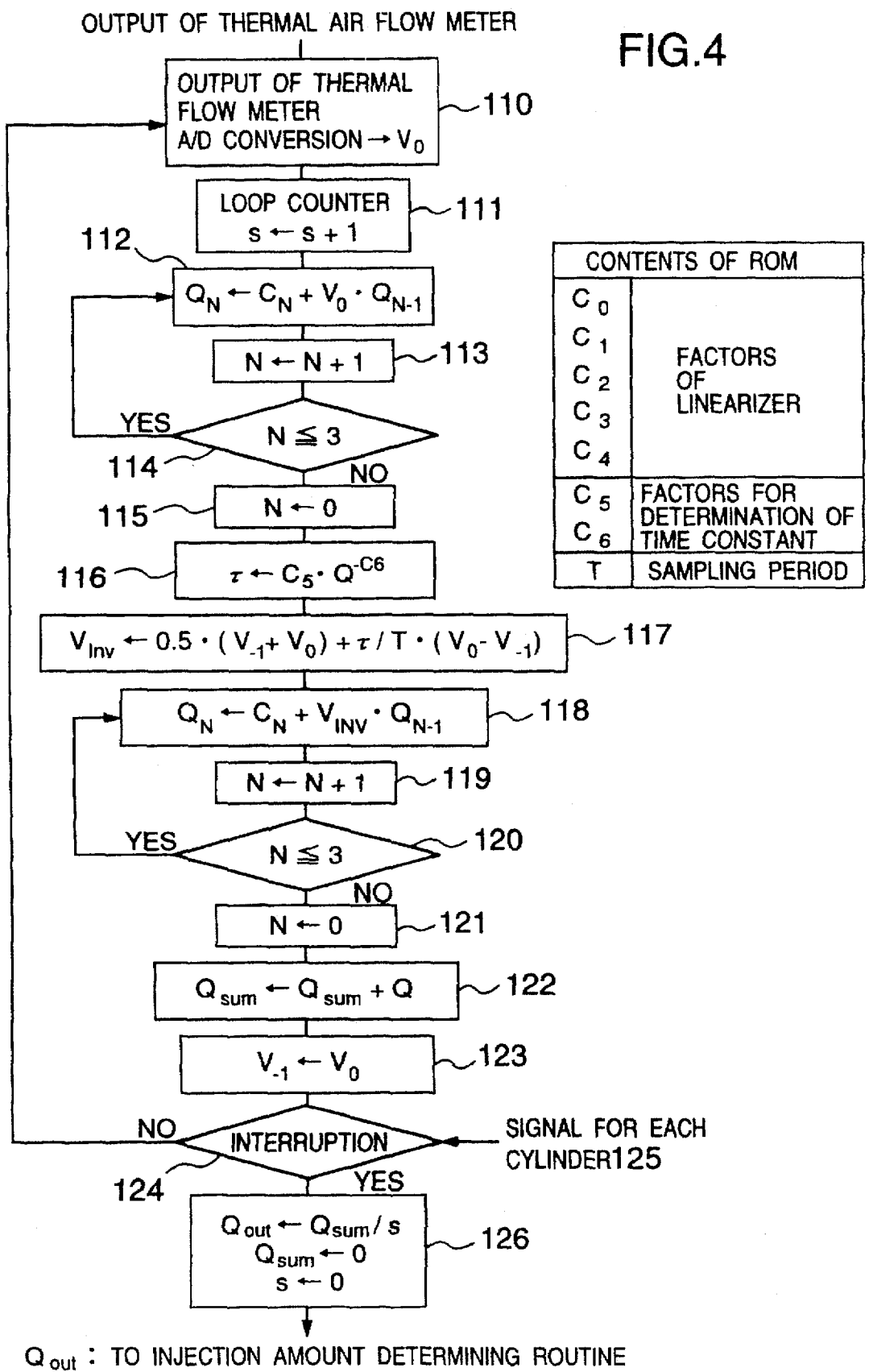
FIG. 4 is a detailed flow chart of the signal processing method in the embodiment of the air flow rate measuring method of the present invention.
Figure 6:
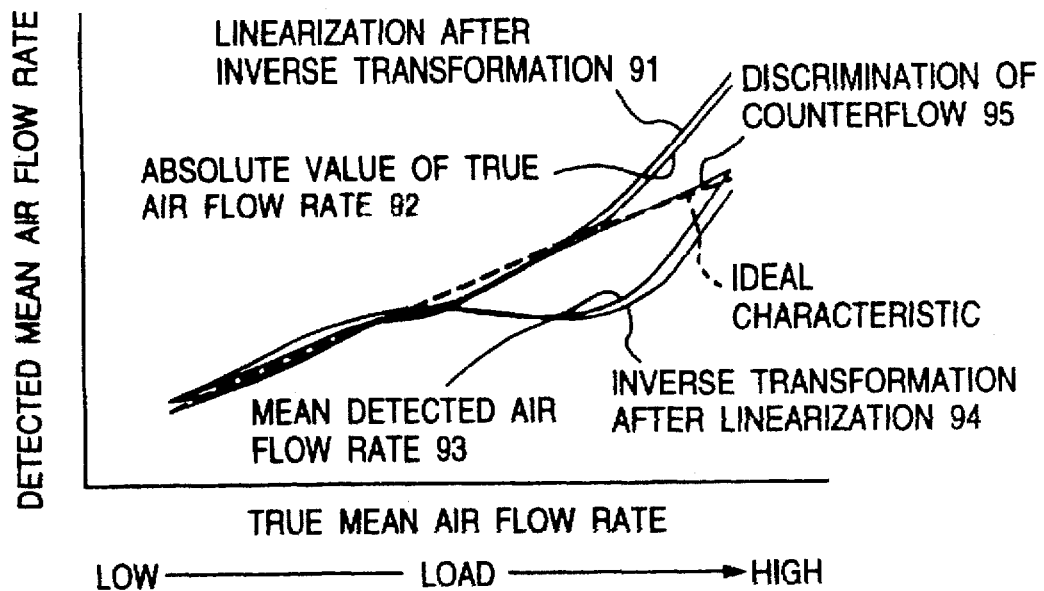
FIG. 6 is a diagram comparatively showing a true mean air flow rate when a load is changed at a constant rotation speed and a mean air flow rate which is determined through an inverse transformation.
Figure 7:
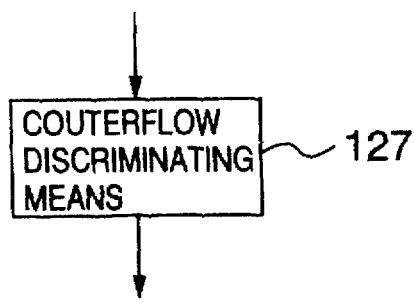
FIG. 7 is a diagram showing a step of detecting a counterflow in the intake system of an engine.

A signal processing according to the first embodiment of the present invention will be explained in reference to FIGS. 1 to 7. FIG. 1 is a block diagram of a hardware in the present embodiment. FIG. 2 is a block diagram of a signal processing method in the present embodiment. FIG. 3 is a diagram showing a relationship between an air flow rate and a time constant. FIG. 4 is a diagram showing the details of the signal processing method in the present embodiment. FIG. 5 is a diagram showing a processed waveform obtained in accordance with an inverse transformation system in the present embodiment. FIG. 6 is a diagram showing a true mean air flow rate when a load is changed at a constant rotation speed and a mean air flow rate which is determined through an inverse transformation. FIG. 7 is a diagram showing a step of detecting a counterflow.

FIG. 1 shows an electronic fuel injection system for engine using a thermal air flow meter. Air to be taken into an engine 212 passes through an air cleaner (not shown) and is subjected to the measurement of an air flow rate by a thermal flow meter 202. Thereafter, the air is passed through an intake pipe 214 and a throttle portion 213 and is mixed with fuel supplied by an injector 210 so that the mixture flows into the engine 212. After having been subjected to combustion by the engine 212, the mixture is discharged as an exhaust gas through an exhaust pipe 211 into the atmosphere. A fuel injection amount atomized from the injector 210 is determined in such a manner that a signal 201 outputted from the thermal air flow meter 202 and various signals 215 as auxiliary signals, for example, for monitoring the operating conditions of for a crank angle sensor (not shown), an air/fuel ratio sensor (not shown) and so on are taken into an engine control unit 206 (hereinafter abbreviated to ECU) to obtain the optimum operating condition for the lean burn control of the engine or the like.

The ECU 206 is mainly composed of an input port 203, a RAM 204, a ROM 205, a CPU 208 and an output port 207. Signals inputted to the ECU 206 are subjected to operation processing and are thereafter sent as control signals to various actuators (not shown) from the output port 207. In FIG. 1, a signal 209 sent to the injector 210 is shown as one example.

In the present embodiment an example is shown in which the processing is performed in the ECU. However, the overall processing as shown in FIGS. 4 and 7 may be performed by the thermal air flow meter 202 itself or the interior of a preprocessor 216. Also, a part of the processing may be allotted to the thermal air flow meter 202 or the preprocessor 216. In the case where the processing is performed by the preprocessor 216, signals needed by the preprocessor 216 include at least the signal 201 of the thermal air flow meter 202.

First or in step 101, an output signal of the thermal air flow meter 202 is sampled at a period T so that an analog signal is converted or digitized into a digital signal through A/D conversion. Next, a time constant $\tau$ necessary for performing an inverse transformation for response compensation in step 105 is determined in accordance with equation (1). The time constant $\tau$ is the time constant of an input/output characteristic of the thermal air flow meter 202. The value of A/D conversion is temporarily transformed to a flow rate Q by a linearizer in step 102 and the time constant $\tau$ is determined in step 103 in accordance with the following equation (1):

$$\tau = C_5 \cdot Q^{-C_6}. \quad (1)$$

Here, constants $C_5$ and $C_6$ use, for example, $C_5=0.02$ and $C_6=0.48$.

As the air flow rate becomes larger, the instantaneous heat radiation of a thermal element of the thermal flow meter becomes larger or the thermal element is liable to reach a thermal equilibrium, as also shown by equation 8$a$ of the SAE Paper No. 940377. Therefore, the flow rate dependency of the time constant $\tau$ is such that the time constant $\tau$ has a tendency to decrease as the flow rate becomes larger, as shown in FIG. 3. Accordingly, the time constant $\tau$ is determined in accordance with the air flow rate.

In the present embodiment, the time constant $\tau$ is determined from a flow rate signal having a delay with respect to the pulsating air flow rate of the engine (step 102) but has a sufficient precision in determining a mean flow rate. This time constant $\tau$, the period T of A/D conversion, the preceding value $V_{-1}$ of A/D conversion stored in a memory 104 and the present value $V_0$ of A/D conversion are used to perform the inverse transformation 105 for response compensation represented by equation (2):

$$V_{INV} = 0.5 \cdot (V_{-1} + V_0) + \tau/T \cdot (V_0 - V_{-1}). \quad (2)$$

Since $V_{INV}$ holds a non-linear output characteristic, the linearization is made through a linearizer 106 to determine the flow rate.

Figure 20:
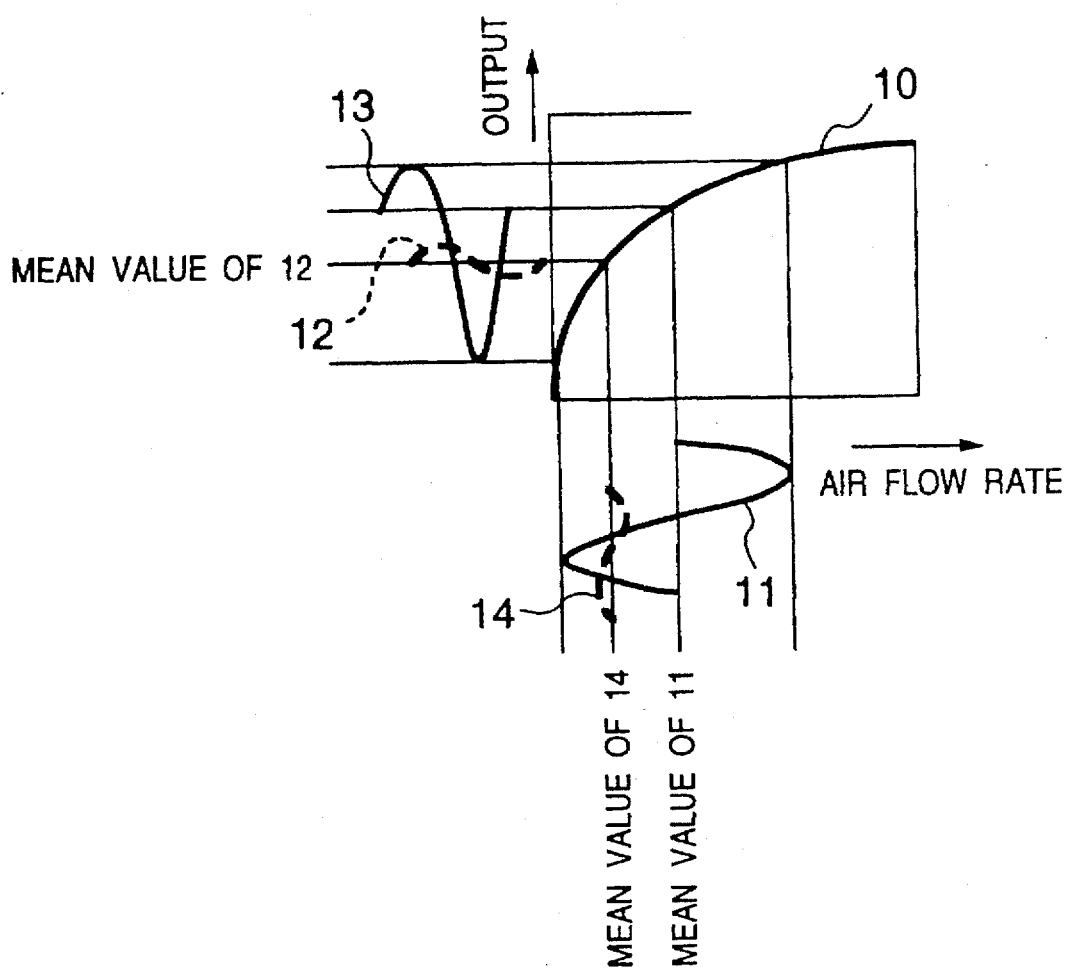
FIG. 20 is a fundamental diagram for explaining a processing for inverse transformation and linearization of the output of a thermal air flow meter in the air flow rate measuring apparatus of the present invention.

Now, explanation referring to FIG. 20 will be made of a principle on the basis of which a true air flow rate is obtained in accordance with the present invention. FIG. 20 shows a transformation characteristic curve 10 of the linearizer for compensating for the non-linear characteristic of the input/output of the thermal air flow rate used in the air flow rate measuring apparatus of the present invention, a true intake air flow rate change 11, an output signal 12 of the thermal air flow meter 202, an output signal 13 of a thermal air flow meter having no response delay, and an output signal 14 obtained by passing the output signal 12 of the thermal air flow meter 202 through the linearizer as it is.

When the non-linear output 13 of the ideal thermal air flow meter having no response delay is subjected to the linearization processing of the characteristic 10 as it is, the original true air flow rate signal 11 is obtained. When the output 12 of the actual thermal air flow meter having a response delay is subjected to the linearization processing as it is, there results in the signal 14. The signal 14 is different in phase, amplitude and mean value from the true air flow rate signal 11, thereby generating a measurement error.

In the thermal air flow rate measuring apparatus according to the present invention, however, the output signal 12 of the thermal air flow meter 202 is first subjected to an inverse transformation processing for compensation for the response delay prior to the subjection to the linearization processing to provide a signal which has the same amplitude and phase as those of the output signal 13 having no response delay. If the signal subjected to an inverse transformation processing is subjected to the linearization processing of the characteristic 10, the true air flow rate signal 11 is obtained.

Further detailed processing of the present embodiment will be explained in accordance with a flow chart shown in FIG. 4. First, the output of the thermal air flow meter is digitized through an A/D conversion and is then stored as a variable $V_0$ into the RAM 204 (step 110). The period T of A/D conversion may be a predetermined time or each constant crank angle. In the case where the A/D conversion is made at the timing of each constant crank angle, there is a need to measure the period T of A/D conversion individually by use of clocks although this not shown. In the case where the A/D conversion is made at the timing of each constant time, the time is selected to be equal to or shorter than 2 ms. For each crank angle, the angle is preferably equal to or smaller than 12° in the case of four cylinders. If the A/D conversion is made every 1 ms, the maximum error is on the order of 3% for the absolute value of the true flow rate.

In order to determine a fuel injection amount, it is necessary to determine the value of flow rate for each cylinder. Therefore, a loop counter (step 111) is provided in order to count the number of times of A/D conversion until the interruption for each cylinder (step 124) is generated. The count number is taken as $s$. In the case where the conversion period is defined by the crank angle, this step can be omitted. The next steps 112 to 114 correspond to the linearizer 102. The linearization can be made using a 4th-order equation generally represented by equation (3):

$$Q=C_0+C_1 \cdot V_0+C_2 \cdot V_0^2+C_3 \cdot V_0^3+C_4 \cdot V_0^4 \qquad (3)$$

The factor $C_N$ is determined from a relationship between an output V and a flow rate Q in a steady state and is recorded in the ROM 205 beforehand. Further, if equation (3) is deformed to $$Q=C_0+V_0(C_1+V_0(C_2+V_0(C_3+C_4 \cdot V_0))), \qquad (4)$$

a repeating element $Q_N$ convenient for operation is extracted as shown by equation (5):

$$Q_N=C_N+V_0 \cdot Q_{N-1}. \qquad (5)$$

In step 112, an operation is performed in which the product of the value V of A/D conversion and the preceding determined $Q_{N-1}$ is added to the factor $C_N$, where N is a repetition number. The repetition number N is incremented by a counter 113 from an initial value 0. The factor $C_N$ is determined from the ROM 205 with the counter value N taken as a reference value for an address number and $Q_N$ is stored into the RAM 204. When it is determined in condition judgement step 114 that the counter value N is not smaller than 4, the flow returns to step 112 so that the loop is repeated.

In the present embodiment, since the 4th-order equation can easily be handled when the linearization is made, the degree of repetition is to be selected to be 4. However, so long as the linearization is possible, the numbers of factors and the number of times of repetition may be changed according to the operating ability of the CPU 208. Further, in order to make the linearization better, there may be, for example, a method in which a map is used. In this method, however, it is required that the capacity of the ROM 205 should be large. In the present embodiment, therefore, the 4th-order equation is used.

If $N \leq 4$ is satisfied in the condition judgement step 114 through the repetition of the loop, N is restored to the initial value 0 in step 115. In step 116, a time constant $\tau$ is determined by use of equation (1) and is then stored into the RAM 204. Next or in step 117, the inverse transformation for response compensation as shown by equation (2) is performed. At this time, the time constant $\tau$, the period T and the value V of A/D conversion use values which have already been stored in the RAM 204. The determined value $V_{INV}$ is stored into the RAM 204. At this point of time, the time constant $\tau$ stored in the RAM 204 may be cleared.

Next, the value $V_{INV}$ of inverse conversion is linearized in steps 118 to 121. These steps are conducted in a manner similar to steps 112 to 115. The same routine may be used on a program and the address in the RAM 204 may also be common. In step 122, the value Q obtained by the linearization is added to the preceding sum $Q_{sum}$ of Q. In step 123, the value $V_0$ of A/D conversion is stored as $V_{-1}$. The foregoing procedure is repeated until an interruption signal 125 for each cylinder, for example, a reference signal of the crank angle sensor is applied. In the case where the interruption signal is applied, the flow gets out of the loop in step 124. Thereafter or in step 126, the sum $Q_{sum}$ of Q is divided by the number $s$ of times of looping to determine a mean flow rate $Q_{out}$ and each of the sum $Q_{sum}$ and the loop counter value $s$ is restored to the initial value 0.

The mean flow rate $Q_{out}$ delivered to an injection amount determining routine in which a correction factor is added on the basis of information given from various sensor signals 215 for monitoring the engine to determine a fuel injection amount and a signal is thereafter transmitted from the output port 207 to the injector 210.

The actual processed waveform is shown in FIG. 5. As apparent from FIG. 5, the conventional detected flow rate waveform 705 has a response delay with respect to a true pulsating flow rate 704 and a detected mean flow rate becomes smaller than a true mean flow rate. In contrast with this detected flow rate waveform 705, a waveform 806 is an inversely transformed flow rate obtained by performing the processing mentioned in conjunction with the present embodiment. It is seen that the inversely transformed flow rate waveform 806 involves a noise induced variation in the vicinity of the peak of the pulsation but follows the true flow rate waveform. A mean flow rate at this time is determined to obtain an inversely transformed mean flow rate 803 ($Q_{out}$). In a state in which no counterflow is generated, the inversely transformed mean flow rate 803 becomes close to the true mean flow rate 701. Thus, the arrangement eliminates the error of the detected mean flow rate becoming smaller than the true mean flow rate.

As seen by a curve 91 shown in FIG. 6, the determined mean flow rate $Q_{out}$ is free of the error of lowering of the detected flow rate and reflects the true rate over a wide range. Accordingly, the curve 91 reproduces the absolute value 92 of the true flow rate. At the time of high load when a counterflow is generated, the curve 91 takes a value larger than that of the true flow rate since the counterflow is not discriminated. However, the curve 91 matches the characteristic of an engine which requires excess fuel at the time of high load. In the case where a more precise control is required even in the high load region, step 127 for discrimination of a counterflow in the intake duct as shown in FIG. 7 may be provided between step 121 and step 122. With the discrimination of the presence/absence of a counterflow, the correction for counterflow component is made to obtain a curve 95 shown in FIG. 6. As a result, the detected flow rate can reproduce the true flow rate even in a region in which the counterflow is generated.

Steps 112 to 114 or 118 to 120 can use a map with which the reference to a flow rate can be made on the basis of the value V of A/D conversion or the value $V_{INV}$ of inverse transformation.

Figure 8:
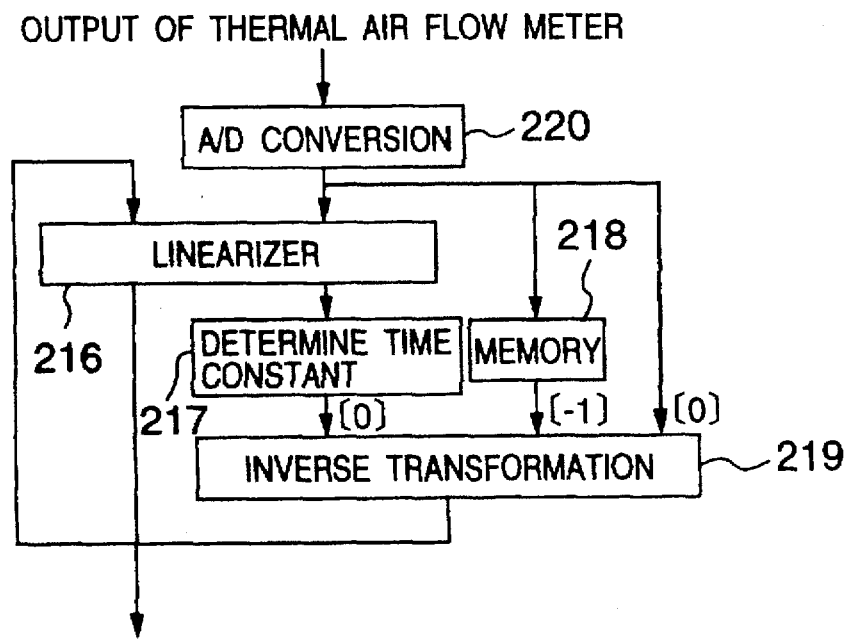
FIG. 8 is a flow chart showing an air flow rate measuring method according to the second embodiment of the present invention.

A second embodiment of the present invention will be explained using FIG. 8. FIG. 8 is a diagram showing the construction of a waveform processing method of the present embodiment. As seen from FIG. 8, in the present embodiment, the output signal of a thermal air flow meter is first digitized through an A/D conversion at a period T (step 220). Next, a time constant τ is determined in order to perform an inverse transformation for response compensation (step 219). The value of A/D conversion is temporarily transformed to a flow rate Q by a linearizer (step 216) and the time constant τ is thereafter determined in step 217 by use of equation (1). At this time, the time constant τ is determined from a flow rate signal having a delay with respect to the pulsating air flow rate of the engine but has a sufficient precision in determining a mean flow rate. This time constant τ, the period T of A/D conversion, the preceding value ($V_{-1}$) of A/D conversion stored in a memory 218 and the present value $V_0$ of A/D conversion are used to perform the inverse transformation 219 for response compensation in accordance with equation (2). Since $V_{INV}$ is non-linear, the linearization is made to determine a true flow rate.

Figure 9:
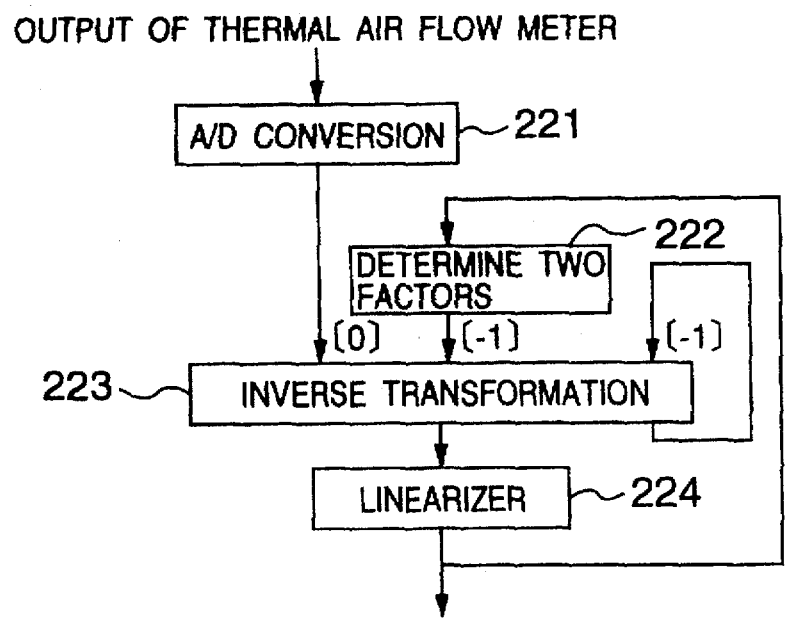
FIG. 9 is a flow chart showing an air flow rate measuring method according to the third embodiment of the present invention.

A third embodiment of the present invention will be explained using FIG. 9. FIG. 9 is a diagram showing the construction of a waveform processing method of the present embodiment. As seen from FIG. 9, in the present embodiment, the output signal of a thermal air flow meter is A/D converted (step 221) and the A/D converted signal is subjected to inverse transformation. But, the signal subjected to the inverse transformation is a signal in which the non-linearity of the thermal air flow meter is maintained. After the inverse transformation (step 223), the signal is inputted to a linearizer 224 to obtain a true flow rate signal. A constant, which is used in performing the inverse transformation and which corresponds to a time constant, is determined in such a manner that the flow rate signal obtained by the linearizer 224 is fed back to step 222.

Figure 10:
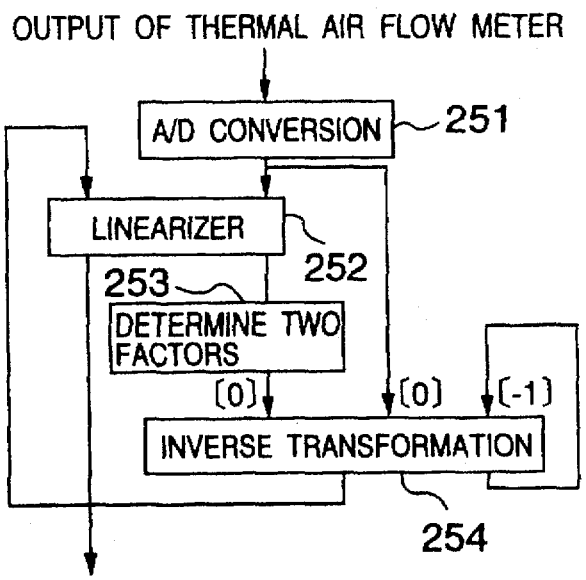
FIG. 10 is a flow chart showing an air flow rate measuring method according to the fourth embodiment of the present invention.

A fourth embodiment of the present invention will be explained using FIG. 10. FIG. 10 is a diagram showing the construction of a waveform processing method of the present embodiment. As seen from FIG. 10, in the present embodiment, a signal subjected to A/D conversion (step 251) is separated into two systems so that the signal in one of the two systems is passed through a linearizer 252 and factors are determined from the linearized signal in step 253. In this case, the factors are determined from the signal having a delay but have a sufficient precision in determining a mean value. Since a signal subjected to inverse transformation (step 254) holds a non-linearity, it is reduced to a true flow rate by passing the signal through the linearizer 252 again.

Figure 11:
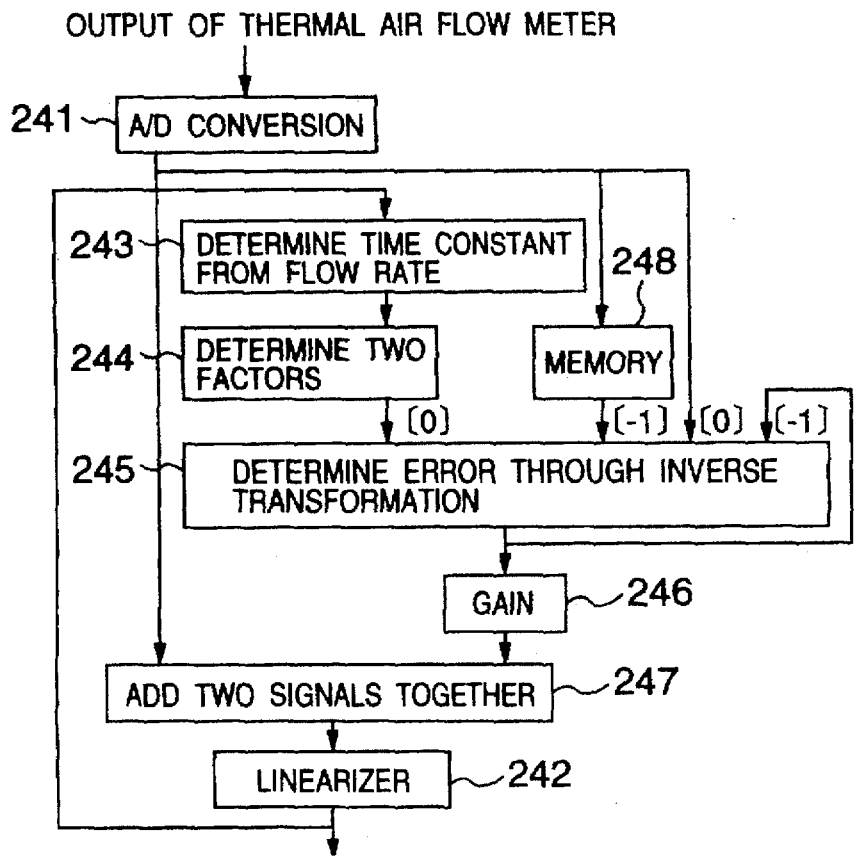
FIG. 11 is a flow chart showing an air flow rate measuring method according to the fifth embodiment of the present invention.

A fifth embodiment of the present invention will be explained using FIG. 11. FIG. 11 is a diagram showing the construction of a waveform processing method of the present embodiment. As seen from FIG. 11, in the present embodiment, a signal subjected to A/D conversion (step 241) is separated into two systems so that an inverse transformation for determining an error from an output corresponding to a true flow rate is performed in one of the two systems and the signal subjected to the inverse transformation is added to the other system in step 247 of the final stage to determine an output having a non-linearity corresponding to the true flow rate. This output signal is linearized by use of a linearizer 242 for reduction to a true flow rate. Explaining the system for determining the error, a signal from the linearizer 242 is fed back to determine a time constant represented by the function of an air flow rate (step 243) and two factors related to the time constant and the period of A/D conversion are thereafter determined (step 244). Also, the value of A/D conversion is stored into a memory 248. In performing the operation of inverse transformation (step 245), there are used the two factors, the preceding value of A/D conversion stored in a memory 248, the present value of A/D conversion and the present determined error. The error thus determined is multiplied by a gain 246. In step 247 of the final stage, the value of multiplication is added to the value of A/D conversion before the separation into the two systems to determine a non-linear output corresponding to a true flow rate. Thereafter, the true flow rate is determined by the linearizer 242.

Figure 12:
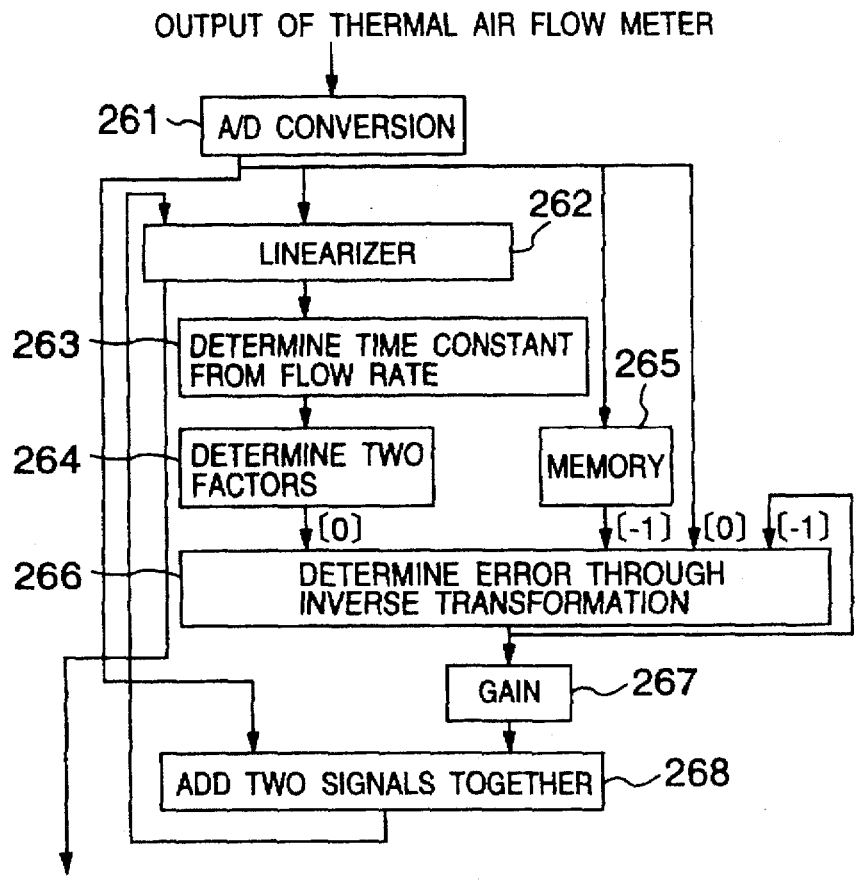
FIG. 12 is a flow chart showing an air flow rate measuring method according to the sixth embodiment of the present invention.
Figure 13:
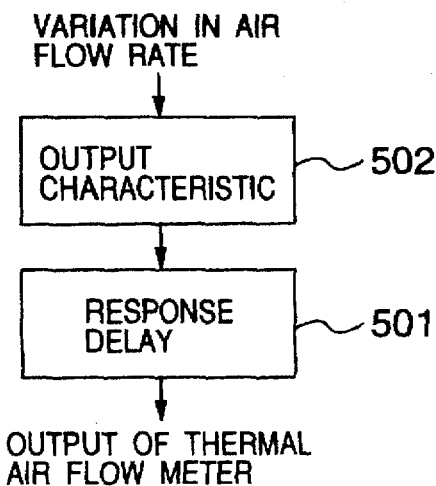
FIG. 13 is an input/output model of a thermal air flow meter used in the embodiment of the present invention.
Figure 14:
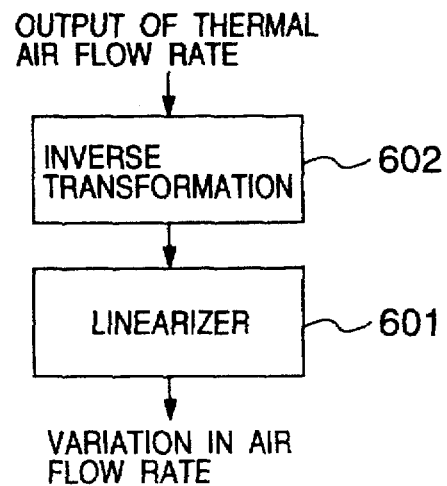
FIG. 14 is a diagram showing an inverse transformation model used in the embodiment of the present invention.
Figure 15:
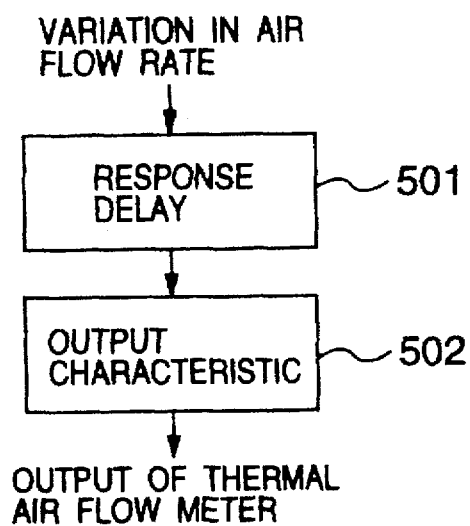
FIG. 15 is an input/output model of the conventional thermal air flow meter.
Figure 16:
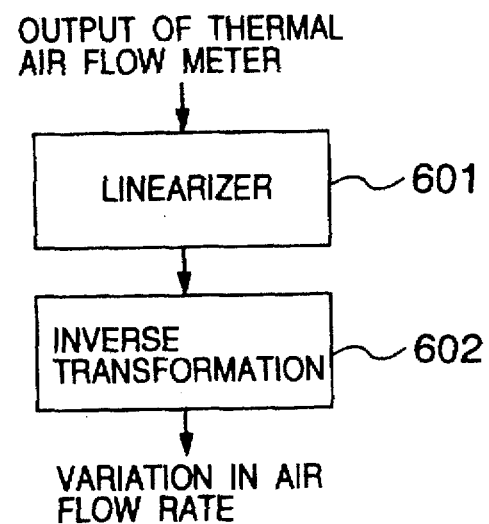
FIG. 16 is a diagram showing an inverse transformation model of the conventional thermal air flow measuring apparatus.
Figure 17:
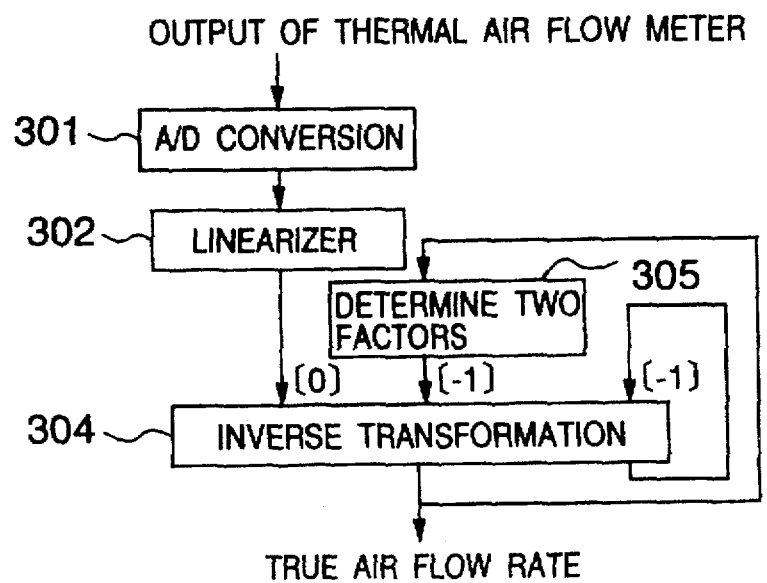
FIG. 17 is a flow chart of the measurement of a flow rate in the conventional thermal air flow measuring apparatus.
Figure 18:
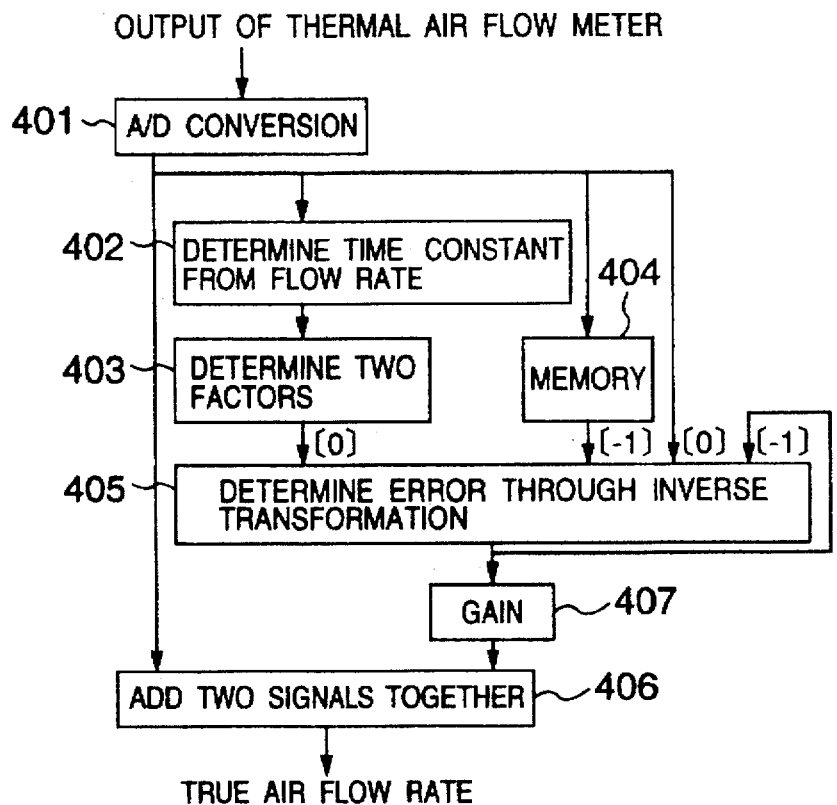
FIG. 18 is a flow chart of the measurement of a flow rate in the conventional thermal air flow measuring apparatus.
Figure 19:
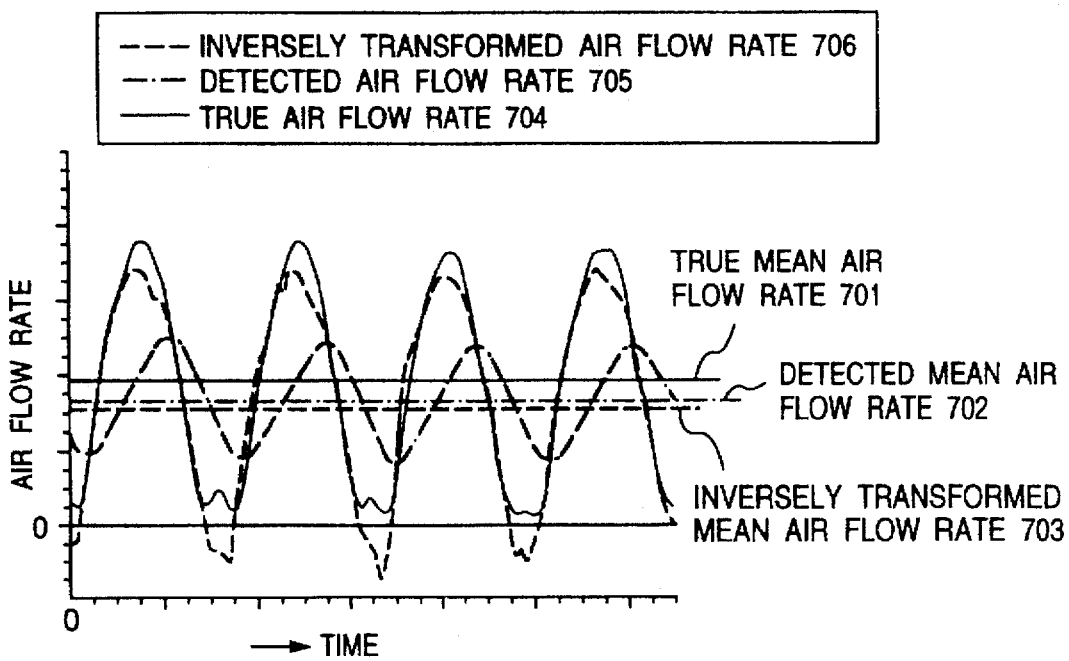
FIG. 19 is a diagram showing a true air flow rate and an air flow rate inversely transformed in accordance with the conventional method.

A sixth embodiment of the present invention will be explained using FIG. 12. FIG. 12 is a diagram showing the construction of a waveform processing method of the present embodiment. As seen from FIG. 12, in the present embodiment, a signal subjected to A/D conversion (step 261) is separated into two systems so that an inverse transformation for determining an error from an output corresponding to a true flow rate is performed in one of the two systems and the signal subjected to the inverse transformation is added to the other system in step 268 of the final stage to determine an output having a non-linearity corresponding to the true flow rate. Thereafter, the signal is returned to a linearizer (step 262) for reduction to the true flow rate.

Explaining the system for determining the error, the value of A/D conversion is passed through the linearizer (step 262). Next or in step 263, a time constant represented by the function of an air flow rate is determined. Further, two factors related to the time constant and the period of A/D conversion are determined in step 264. At this time, the time constant τ is determined from a flow rate signal having a delay with respect to the pulsating air flow rate of the engine but has a sufficient precision in determining a mean flow rate. Also, the value of A/D conversion is stored into a memory (step 265). In performing the inverse transformation (step 266) for determining the error from an output corresponding to a true flow rate, there are used the two factors, the preceding value of A/D conversion stored in the memory, the present value of A/D conversion and the present determined error. The determined error is multiplied by a predetermined gain (step 267). The value of multiplication is added to the value of A/D conversion before the separation into the two systems to obtain a signal which holds a non-linear output corresponding to a true flow rate. The signal is returned to the linearizer (step 262) again, thereby making it possible to obtain the true flow rate.

In the first to sixth embodiments, the A/D conversion is made at the period of T. However, the sampling can be made for every constant crank angle, for example, 12°. In this case, the sampling period can be made variable by measuring the period T by use of clocks, though not shown.

As mentioned in the foregoing, according to a thermal flow meter of the present invention, in the case where the intake air amount is measured by a thermal flow meter having a slow response, an inverse transformation for compensation of the response of an output of the thermal flow meter is first performed and a signal processing for linearizing the signal by a linearizer is thereafter performed. Thereby, the present invention provides an effect that even in the case where the pulsation is generated, the abnormal lowering of a mean detected flow rate is eliminated, thereby making it possible to determine an accurate mean flow rate.

In a thermal air flow meter to which the air flow rate measuring apparatus of the present invention mentioned in the above is applied, either a thin-film resistor element, a semiconductor device or a hot wire may be used as a heating element. Also, as the system of arrangement of the thermal air flow meter, there is possible either a system in which the heating element is arranged in a path bypassing an intake path or a system in which the heating element is arranged directly in the intake path.

The present invention is not limited to the embodiments disclosed in the foregoing. Improvements and alterations capable of being easily made by those skilled in the art on the basis of the disclosure without the spirit of description in the claims will be included in the present invention.

We claim:

1. An air flow rate measuring apparatus for measuring an intake air amount of an internal combustion engine by use of a thermal air flow meter, comprising:

means inputted with an output of said thermal air flow meter for correcting a response delay of said output and outputting a corrected output; and means inputted with the output of said correcting means for transforming it to a value corresponding to an air flow rate on the basis of a characteristic of said thermal air flow meter stored beforehand.

2. An air flow rate measuring apparatus according to claim 1, wherein the characteristic of said thermal air flow meter stored beforehand is stored in the form of a function representing the characteristics, and wherein said transforming means includes means for determining said value corresponding to the air flow rate through an operation of said function.

3. An air flow rate measuring apparatus according to claim 1, wherein the characteristic of said thermal air flow meter stored beforehand is stored in the form of a table having data representing the characteristic, and wherein said transforming means includes means for determining said value corresponding to the air flow rate on the basis of said data of said table.

4. An air flow rate measuring apparatus comprising sampling means for periodically sampling an output signal of a thermal air flow meter, and operating means for determining a time constant from the signal sampled by said sampling means, inversely transforming said output signal to a signal corresponding to a true flow rate with said time constant being taken as a parameter and subjecting the inversely transformed signal to linearization to determine an air flow rate.

5. An air flow rate measuring apparatus comprising sampling means for periodically sampling an output signal of a thermal air flow meter to provide a sampled signal, time constant determining means for determining a time constant from the sampled signal, inverse transformation means for transforming said output signal to a signal corresponding to a true flow rate with said time constant being taken as a parameter to provide an inversely transformed signal, and linearizing means having a linearizing function for the inversely transformed signal, an air flow rate being determined by linearizing said output signal by said linearizing means after the determination of the time constant by the time constant determining means and the inverse transformation of the output signal by said inverse transformation means.

6. An air flow rate measuring apparatus comprising an A/D converter for periodically sampling an output signal of a thermal air flow meter to provide a digital signal, operating means for separating said digital signal obtained through the A/D conversion by said A/D converter into two systems so that an inverse transformation for determining an error from an output corresponding to a true air flow rate is performed in a first system to provide an inversely transformed value and so that the inversely transformed value is added to a second system, and means for subjecting a signal obtained by the addition to linearization to determine a flow rate.

7. An air flow rate measuring method comprising a step of periodically sampling an output signal of a thermal air flow meter to provide a sampled signal, a step of determining a time constant from the sampled signal, a step of inversely transforming said output signal to an inversely transformed signal corresponding to a true air flow rate with the determined time constant being taken as a parameter, and a step of subjecting the inversely transformed signal to linearization to determine an air flow rate.

8. An air flow rate measuring apparatus according to claim 4, wherein said time constant is a time constant of a first-order delay and said time constant is determined by said time constant determining means from an output obtained by directly linearizing the output signal of said thermal air flow meter by linearizing means.

9. An air flow rate measuring apparatus comprising sampling means for periodically sampling an output signal of a thermal air flow meter, and operating means for determining a time constant from the signal sampled by said sampling means, inversely transforming said output signal to a signal corresponding to a true flow rate with said time constant being taken as a parameter and subjecting the inversely transformed signal to linearization to determine an air flow rate, wherein said inverse transformation means performs an operation of $$V_{INV} = 0.5 \cdot (V_{-1} + V_0) + \tau/T \cdot (V_0 - V_{-1})$$

where $V_{INV}$ is the inversely transformed signal, V is the output signal of the thermal air flow meter, $\tau$ is the time constant, T is the sampling period, $V_0$ is the value of the output signal at the present instant of time, and $V_1$ is the value of the output signal at the preceding sampling instant of time.

10. An air flow rate measuring apparatus according to claim 4 or 5, wherein the linearizing means for determining said time constant and the linearizing means for linearizing the inversely transformed signal are realized by the same means.

11. An air flow rate measuring apparatus according to claim 4, wherein the sampling period is defined in accordance with a crank angle of said thermal air flow meter.

12. An air flow rate measuring apparatus according to claim 11, wherein said sampling period is each crank angle equal to or smaller than 12°.

13. An air flow rate measuring apparatus according to claim 4, wherein the sampling period is measured by clocks, and wherein this period is variably set in accordance with a rotation speed of said internal combustion engine.

14. An air flow rate measuring apparatus according to claim 4, wherein said thermal air flow meter measures the intake air amount of an internal combustion engine, and wherein said air flow rate measuring apparatus includes means for discriminating a counterflow in an intake system of said internal combustion engine.

15. An air flow rate measuring apparatus comprising sampling means for periodically sampling an output signal of a thermal air flow meter to provide a sampled signal, time constant determining means for determining a time constant from the sampled signal, inverse transformation means for transforming said output signal to a signal corresponding to a true flow rate with said time constant being taken as a parameter to provide an inversely transformed signal, and linearizing means having a linearizing function for the inversely transformed signal, an air flow rate being determined by linearizing said output signal by said linearizing means after the determination of the time constant by the time constant determining means and the inverse transformation of the output signal by said inverse transformation means;

comprising sampling means for periodically sampling an output signal of a thermal air flow meter, and operating means for determining a time constant from the signal sampled by said sampling means, inversely transforming said output signal to a signal corresponding to a true flow rate with said time constant being taken as a parameter and subjecting the inversely transformed signal to linearization to determine an air flow rate, wherein said inverse transformation means performs an operation of $$V_{INV} = 0.5 \cdot (V_{-1} + V_0) + \tau/T \cdot (V_0 - V_{-1})$$

where $V_{INV}$ is the inversely transformed signal, V is the output signal of the thermal air flow meter, $\tau$ is the time constant, T is the sampling period, $V_0$ is the value of the output signal at the present instant of time, and $V_{-1}$ is the value of the output signal at the preceding sampling instant of time.

* * * * *